Aug. 14, 1934.  F. G. BLOCH  1,970,219
DEVICE FOR INDICATING TEMPERATURE
Filed March 3, 1932  2 Sheets-Sheet 1
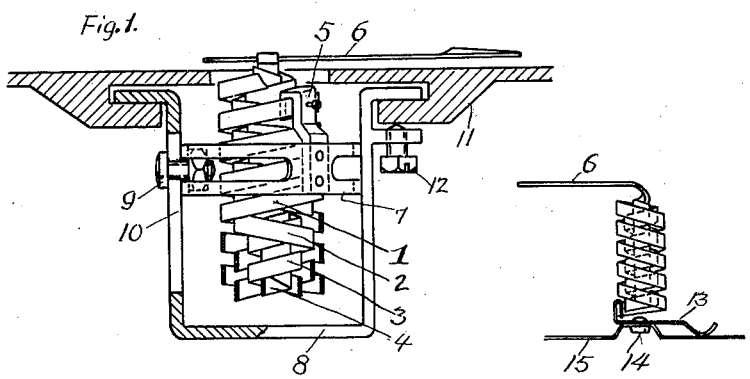
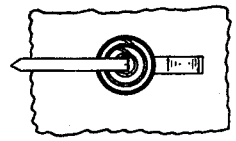
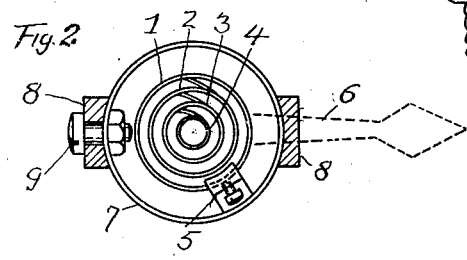
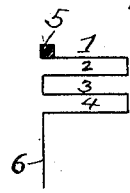
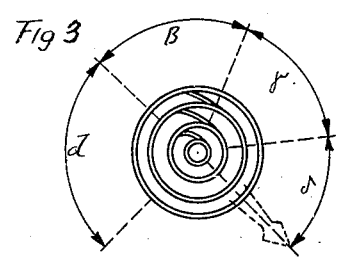

Aug. 14, 1934.   F. G. BLOCH   1,970,219
DEVICE FOR INDICATING TEMPERATURE
Filed March 3, 1932   2 Sheets-Sheet 2
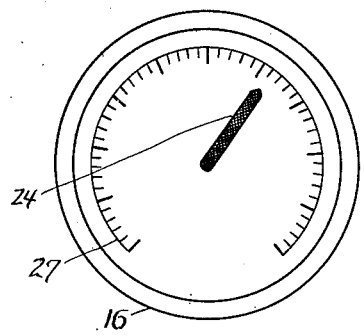
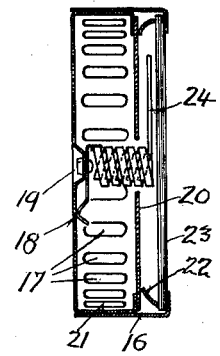
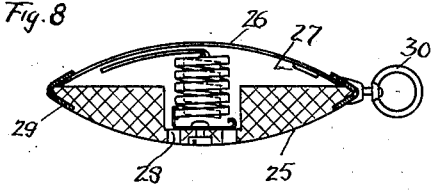
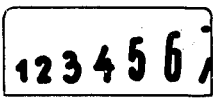
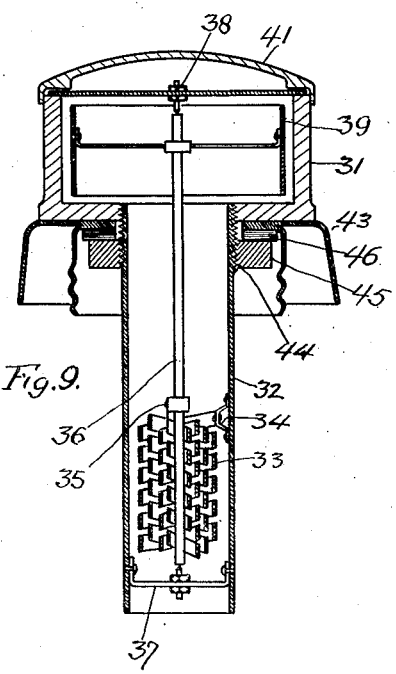
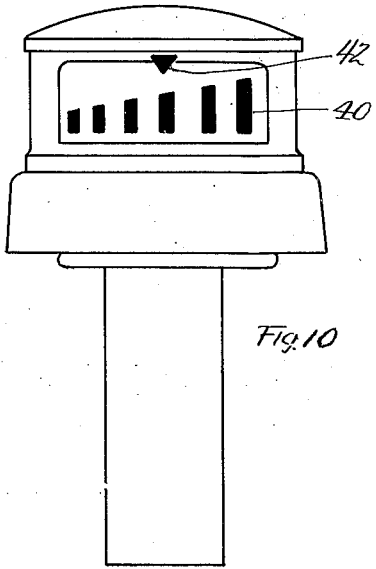

Patented Aug. 14, 1934

1,970,219

UNITED STATES PATENT OFFICE 1,970,219

DEVICE FOR INDICATING TEMPERATURE

Franz Georg Bloch, Dresden, Germany

Application March 3, 1932, Serial No. 596,633
In Great Britain January 12, 1932

4 Claims. (Cl. 73—118)

This invention relates to a mechanical device for indicating and recording temperatures.

More particularly the invention relates to an improved thermometer of that class in which a pointer is moved over a calibrated dial by the expansion and contraction of a bi-metallic strip.

One object of the invention is to provide a thermometer of the foregoing class with an increased indicating capacity.

A further object of the invention is to improve and simplify the construction of thermometers of the foregoing class and thereby to cheapen the cost of production thereof.

Still a further object of the invention is to provide a thermometer of strong and compact construction which is relatively insensitive to shock or impact.

Still a further object of the invention is to provide a thermometer of such sensitiveness to temperature variations that clearly legible throws of the pointer are obtained even with slight fluctuations of temperature and in which the pointer moves immediately and steadily with any fluctuations of temperature instead of lagging and moving jerkily.

With the foregoing and other objects in view, the invention contemplates the combination of a plurality of bi-metallic helices of different diameters in co-axial disposition, such that the rotational angles described by the individual helices under the influence of temperature changes are additive and the direct connection of the pointer to the free end of one of the helices.

In carrying out the invention, the individual helices may be made from a single bi-metallic strip which is formed into a plurality of co-axially disposed helices of different diameters.

The present invention accordingly permits a plurality of bi-metallic helices to be located one inside the other thereby producing a very neat and compact construction.

Further objects and additions of the invention will become apparent from the following description.

In the accompanying drawings:—

Fig. 1 is a sectional side elevation of the temperature sensitive member and pointer of one embodiment of thermometer in accordance with the invention;

Fig. 2 is a plan section through Fig. 1;

Fig. 3 is a top plan view of Fig. 2;

Fig. 4 is a plane projection of the helical unit of Fig. 1;

Fig. 5 is an elevation of a second embodiment of helical unit;

Figs. 6 and 7 are respectively a top plan view and a cross-section of an indoor thermometer equipped with a temperature sensitive unit in accordance with the invention;

Fig. 8 is a cross-section through a bath thermometer embodying the invention;

Figs. 9 and 10 are respectively a vertical section and an elevation of a thermometer for motor car radiators embodying the invention;

Fig. 11 illustrates a modification of the dial of Fig. 10;

The embodiment illustrated in Figs. 1 to 4 comprises a plurality of spring helices indicated by 1, 2, 3 and 4, co-axially disposed one within the other. Here, the spring 1 is a right-handed helix, spring 2 is left-handed, spring 3 is again right-handed and 4 is left-handed. The left end of the spring 1 is secured to the fixed-point adjustment 5, the right end of spring 1 is connected to the right end of spring 2, the left end of spring 2 is attached to the left end of spring 3, and the right end of spring 3 to the right end of spring 4. The pointer 6 is mounted on the left end of the spring 4. The unit operates in the following manner:

If, for example, the temperature rises, the end of the bimetallic spring 1, turns through a definite angle $\alpha$, say in clockwise direction, with the scale facing the observer. The spring 2 turns, in a similar manner, through the angle $\beta$, spring 3 through the angle $\gamma$, and spring 4 through the angle $\delta$. The spring being, as described, mechanically interconnected, these angles totalize to the angle $\alpha+\beta+\gamma+\delta$ at the pointer 6. This example shows that a large number of turns can be combined to a unit of low height, so that, in this way, any practical deflection of the pointer and the corresponding torsional force can be obtained by the aid of the numerous possible designs of the rotary bimetallic unit according to the invention. In the example, the fixed point adjustment 5 consists of a clamp and screw, mounted on a ring 7, secured to the frame 8 by the screw 9. This frame is provided with a slot 10, in which the screw 9 is adapted to slide. If, in standardizing the instrument, one of the turns, for example, of spring 1 is to be put out of action, the ring 7 is displaced a distance corresponding to one turn, in the axial direction of the unit. If, on the other hand, only a portion of a turn is to be put out of action, the ring is moved radially through the corresponding angle. The neutral point adjustment is affected by turning the frame 8 in the casing 11, and securing it by means of one or more screws 12. Fig. 5 shows the same rotary unit, but of smaller dimensions, with three concentrically disposed bimetallic springs, the pointer 6 in this case being integral with the inner spring. The zero point adjustment of the unit is represented by the lever 13, which carries the spring unit on its one end, and is mounted, by the bolt 14, on the base in such a manner that its one arm presses slidably against the base plate 15, thereby setting up such a braking effort that the adjustment can only be effected by the exertion of a certain amount of force. The bolt 14 recoacts with a slot or adjustment holes, so that the zero point of the unit can be adjusted from outside, by the aid of a suitable tool. Of course, some other suitable arrangement familiar to the experienced instrument maker may be used instead.

Fig. 6 is a plan and Fig. 7 a cross section of an indoor thermometer equipped with the rotary bimetallic unit according to the invention. 16 is an annular casing with ventilating holes 17 allowing the air, or other medium that is to be measured, to gain access to the measuring unit. The baseplate 18 has a projecting portion 19 accommodating the means for holding the bimetallic spring and, at the same time, adjusting the zero point. 20 is a dial provided with the scale and suported by three or more stays, secured on or integral with the baseplate. 22 is a spacing ring which keeps the transparent disc 23 at a definite distance from the dial 20. The pointer 24, which, in this example, is integral with the bimetallic unit, moves between 20 and 23. This embodiment can be used to hang on the wall or in a window, and also as a table thermometer by combining it, in various ways, with a baseplate to form a stand. Of course, there is no need to restrict the thermometer to the circular shape, but, on the contrary, it may be of any form, polygonal, oval, etc. presenting an artistic appearance.

Fig. 8 is a cross section through a bath thermometer and differs from the foregoing embodiment in that it can be designed to float, for which purpose many means are available. In the embodiment illustrated, the lower portion 25 of the casing is made of buoyant material, whilst the upper portion 26 is of transparent, water- and heat-proof material, to the inner face of which the scale 27 is preferably affixed, so that the reading of the temperature is not hampered by vapour, water of condensation, etc. The casing 25 is provided with holes 28 through which the medium to be measured is admitted direct to the measuring unit. In the present instance the upper and lower parts are held together by means of a ring 29, and a ring 30 is provided for holding the thermometer. The instrument can of course, be employed for dry measurements, and it may be constructed in the form of a watch, or the like, so that it can be conveniently carried in the pocket.

Fig. 9 illustrates an embodiment of the invention, intended for rough usage, especially for motor-car radiators. It consists of the casing 31 and attached cylinder 32. The cylinder houses the temperature responsive element 33, the fixed end 34 of the unit being attached to 32, whilst the loose end 35 engages the spindle 36. The spindle is rotatably mounted in the bearing 37 (mounted in the casing 32) and upper bearing 38. Centerpoint bearings are adopted here, but any other known type of bearing may be used. The spindle carries the drum 39, which is provided with the scale 40, and the thermometer is covered by a lid 41. The casing is provided with a window (of two diametrically opposite windows), the fixed pointer 42 for reading the scale being disposed centrally of the window. The scale is marked as clearly and noticeably as possible, the graduations in the example shown being of increasing length in accordance with the ascending degrees of temperature, as shown in Fig. 10, in order that the observer can already form an opinion with regard to the temperature from the length of the graduation marks. Other arrangements could, naturally, be employed for this purpose, such as that shown in Fig. 11, where the graduations are replaced by numerals of increasing size, which, in this case, all represent ten times their nominal value. For example, if the pointer comes opposite the numeral 3, it indicates that the temperature is 30° C. Other degrees, such as those of Fahrenheit or Réaumur, may also be inscribed on the scale. For mounting the thermometer on the radiator, the example represents an ordinary radiator cap 43. This is provided with a bore, and a thread 44 is cut on the thermometer casing, so that the thermometer can be fixed tightly into the cap 43, by the aid of a nut 45 and elastic washer 46. This embodiment can also be replaced by other fastening means, or the thermometer casing may be integral with the radiator cap. The cylinder is preferably open at the lower end, so that the measuring unit can be influenced directly by the temperature in the radiator without being cooled by any other cause. In some cases, however, the bottom end of the cylinder may be closed, for example for measuring the oil temperature in forced-lubrication machine bearings, or the temperature in the windings of electric generators, in steam boilers, etc. In this latter case, however, the revolving scale and fixed pointer may be replaced by the fixed, circular scale and moving pointer.

I claim:—

1. A mechanical device for indicating temperatures comprising a plurality of strip helices of different diameters, co-axially disposed, one within the other, and so combined that the rotational angles described by the individual helices under the influence of temperature changes are additive, an attachment for one free end of said helices, and an indicating means directly connected to and carried solely by the other free end of said helices.

2. A mechanical device for indicating temperatures comprising a plurality of strip helices of different diameters, co-axially disposed, one within the other, and so combined that the rotational angles described by the individual helices under the influence of temperature changes are additive, said helices being of uniform axial length and having their bases lying substantially in the same planes, an attachment for one free end of said helices, and an indicating means associated with the other free end of said helices.

3. A device according to claim 2 in which there are an even number of strip helices to effect substantially complete compensation as to axial elongation.

4. A mechanical device for indicating temperatures comprising a plurality of strip helices of different diameters, co-axially disposed, one within the other, and so combined that the rotational angles described by the individual helices under the influence of temperature changes are additive, said helices being of uniform axial length and having their bases lying substantially in the same planes, an attachment for one free end of said helices, and an indicating means directly connected to and carried solely by the other free end of said helices.

FRANZ GEORG BLOCH.